United States Patent [19]
Thomas

[11] Patent Number: 6,064,988
[45] Date of Patent: May 16, 2000

[54] DATA PROCESSING SYSTEM INCLUDING TRANSACTION AUTHORIZATION DEVICE

[76] Inventor: Harold K. Thomas, 944 S. 21st St., Mesa, Ariz. 85204

[21] Appl. No.: 09/082,496

[22] Filed: May 21, 1998

Related U.S. Application Data

[63] Continuation of application No. 08/037,729, Mar. 26, 1993, abandoned, which is a continuation of application No. 07/437,448, Nov. 15, 1989, abandoned, which is a continuation-in-part of application No. 07/085,569, Aug. 17, 1987, abandoned.

[51] Int. Cl.$^7$ ...................................................... G06F 17/60
[52] U.S. Cl. .................................. 705/44; 705/38; 705/41
[58] Field of Search .................................. 705/26, 38, 39, 705/44, 41; 235/379, 380

[56] References Cited

U.S. PATENT DOCUMENTS

| | | | |
|---|---|---|---|
| 3,941,977 | 3/1976 | Voss et al. | 235/379 |
| 3,982,103 | 9/1976 | Goldman | 235/380 |
| 4,476,468 | 10/1984 | Goldman | 340/825.034 |
| 4,542,288 | 9/1985 | Drexler | 235/487 |
| 4,544,835 | 10/1985 | Drexler | 235/487 |
| 4,614,861 | 9/1986 | Pavlov et al. | 235/380 |
| 4,636,622 | 1/1987 | Clark | 235/380 |
| 4,766,293 | 8/1988 | Boston | 705/41 |
| 5,655,008 | 8/1997 | Futch et al. | 379/91.01 |

*Primary Examiner*—Allen R. MacDonald
*Assistant Examiner*—M. Irshadullah
*Attorney, Agent, or Firm*—Drummond & Duckworth

[57] ABSTRACT

A supersmart card system is provided for authorizing transactions between a transaction card user and a merchant. The supersmart card system includes a plurality of conventional transaction cards such as a debit cards, credit cards, or phone service cards, and a transaction authorization device. The transaction authorization device is user-carried and constructed to be separate and apart from the transaction card. The transaction authorization device includes logic means for storing data relating to the identity of the transaction card user and data relating to the authorization of transactions between a user and financial institutions or service providers. Preferably, the transaction authorization card also includes means enabling a user to select a particular transaction card for processing a transaction. The supersmart card system therein provides the simple to manufacture and use structure which reduces the potential for fraud arising from theft of a transaction card and which enables a user to carry about a single authorization device for authorizing transactions involving a large number of transaction cards and their corresponding financial institutions and service providers between a transaction card user and merchant.

5 Claims, 4 Drawing Sheets

DATA PROCESSING SYSTEM INCLUDING TRANSACTION AUTHORIZATION DEVICE

This application is a continuation of my prior application Ser. No. 08/037,729, filed Mar. 26, 1993, (now abandoned) which was a continuation of my prior application Ser. No. 07/437,448, filed Nov. 15, 1989, (now abandoned) which was a continuation-in-part application of my prior application Ser. No. 07/085,569, filed Aug. 17, 1987, (now abandoned) entitled Individual Transaction Card.

This invention concerns a data-processing system.

More particularly the invention concerns a data-processing system requiring both processing authorization and operator verification.

In another aspect, the invention relates to a data-processing system with improved security against unauthorized use.

In still another respect, the invention relates to a data-processing system in which the operator provides, and is the sole source, of both the processing authorization, and the operator verification.

Still more particularly, the invention relates to a data-processing system of the type which includes the use of a transaction card, e.g., a conventional plastic card with visually-readable indicia and/or machine-readable indicia, in which provision is made to secure the system against unauthorized use of the transaction card, by someone other than its rightful possessor (if the card is stolen or lost).

In yet another respect, the invention concerns such a system in which provision is made for controlling unauthorized use of the card by its rightful possessor.

Data-processing systems are used to conduct or monitor a wide variety of transactions. For example, such widely-divergent transactions as debit and credit financial transactions, entry authorization, telephone access, pay television, robotics and the like are conventionally controlled and/or monitored by data-processing system which include a central computer, a remote terminal for communicating with the central computer and some form of transaction "card" which interacts directly or indirectly with the terminal and the central computer. For convenience herein, this element of the system is referred to as a "card" because this element commonly takes the form of a wallet-sized plastic card which typically bears visually-readable and/or machine-readable indicia. However, it will be understood that the term "card", as used herein, is defined to include devices which are not necessarily card-shaped, for example, other shaped objects which perform the function of the standard-sized and shaped transaction cards. The term "transaction card" is also used to include other devices and objects, including documents, which themselves have or represent value or which provide access to value, for example, bank checks, "stored fare" cards, travellers's checks, certificates of deposit, stock certificates and various other types of negotiable and non-negotiable instruments.

The most familiar example of the use of data-processing systems to conduct and monitor transactions is the system commonly employed by banks and other financial institutions to conduct and monitor a wide variety of financial transactions including debit and credit transactions, ATM (automatic teller machine) transactions and the like. Such systems are used in practically every country in the world and it is estimated that there are approximately 350,000,000 such financial transaction cards (FTC) in use in the United States and up to twice that number world-wide.

Because of the familiarity of most persons with data-processing systems employing FTC's, the invention will be described with particular reference to such systems. However, it should be clearly understood that the principles of the invention are not limited to the use of data-processing systems for conducting financial transactions but, rather, the invention is susceptible of many embodiments which involve transactions monitored and/or conducted entirely or partly through the use of data-processing systems which include a central computer, a remote terminal and a transaction card.

Although, as indicated above, the use of such data-processing system for monitoring and conducting financial and other transactions is extremely wide-spread and has been found to be practically effective, such systems do suffer from at least one major disadvantage, namely, improper, sometimes fraudulent, use of the FTC. A substantial portion of such improper use occurs through use of the FTC by an unauthorized person after a genuine FTC is lost or stolen. A further substantial proportion of the loss from unauthorized use of an FTC occurs through use of counterfeit FTC's by unauthorized persons. However, the greatest portion of the financial loss caused by improper use of FTC's occurs because of the uncontrolled use of a genuine card by its rightful possessor.

To counter such unauthorized and uncontrolled use of FTC's, the industry has evolved a wide variety of sophisticated security (including control) technologies. In general, these technologies have proven fairly effective, however, as the complexity of the transactions themselves and, in turn, the complexities of the transaction card have increased, the effectiveness of existing security technology has either been reduced or, alternatively, has inhibited the expansion of the use of data-processing systems in this manner.

FTC's used in the banking industry (credit cards), only provide customer and bank identification, transaction authorization is obtained by active on-line communication between authorization center and bank, to both transmit customer purchases and receive updates on customer balances.

The on-line credit card system now in use, has evolved problems that are increasingly costly, and which are problems inherent to the on-line authorization system. Some of these problems are serious loss from theft, fraud and customer overdrafts, ever increasing volume of on-line authorization calls, tending to overload the telephone system, and cause unacceptable delays, increasing resistance by merchants to invest in new and updated equipment, a continuing majority of merchants using hand imprinters, producing paper vouchers costly to process, inability of the present on-line system to service new and potentially huge credit markets, and the on-line system is incompatible with, and cannot be adapted to total electronic banking, which is the ultimate objective of the banking industry.

To further complicate the situation, various industries, in particular the financial industry, are presently testing and contemplating the wide-spread use of so-called "smart cards". These smart cards typically include the major elements and functions of conventional FTC's and also include an embedded microcomputer and many even include a data-entry keyboard and display. The inclusion of the microcomputer allows the smart card to have several functional abilities not possessed by conventional FTC's, including logic, temporary or permanent data storage and the capability of destroying or altering data. Because of such enhanced functions, smart cards can be tailored to specific applications and data-processing systems which employ smart cards as the authorization device, can be used and used more securely in a wider variety of applications, e.g., financial services, medical profiles and services, government identification and licensing, communications services, travel services, employment access and reporting, military skills and training, electronic diagnosis, vehicle routing, work station personalization, software loading and protection and the like.

For a fuller description of the "smart card" technology, see Svigals "Smart Cards, The Ultimate Personal Computer" (MacMillan, 1985). Also see Svigals, "Smart Cards—A Critical Decision Point" (Journal of Retail Banking, Spring 1987).

More recently, the credit card industry has addressed the problems of the on-line authorization system, by proposing to combine a supersmart card with a conventional bank card to make a single multifunction card by which to provide off-line authorization at the point-of-sale. A supersmart card is essentially a smart card to which has been added a keyboard and display panel. It is in effect a small computer. It can store vast amounts of information, perform calculations, generate algorithmic authorization numbers, and control the input and output of information according to pre-determined business rules and protocol. Access is secured by means of a customer personal identification number (PIN). Such a card, and, in addition, including the information normally provided by the conventional bank card, is projected to be the foundation for a total new off-line authorization system, and replacing the present on-line system. The supersmart multifunction card, however, must meet certain severe restrictions. The reason for this is due to the vast infrastructure that has evolved to handle the present credit card system. To function within this present infrastructure, any bank card, must retain the same physical dimensions. A test version of the multifunction card has been produced, an improved version is projected for 1992. The multifunction test card was constructed by implanting batteries and circuitry chips between two thin stainless steel plates coated with plastic. The multifunction card, in addition to a keyboard and display panel, must also carry the embossed customer name and identification number, the bank name and logo, customer signature panel, magnetic stripe, and the credit card company name and logo. Embossing the customer identification number and name, by the bank, at the time of issue, cannot be done by the usual method; the heat and pressure would damage the batteries and chips. Instead, a plastic strip is pasted on the card, and the desired numbers or letters engraved by a milling machine.

Those skilled in the art will understand that there are significant practical obstacles to the wide-spread replacement of the current ISO-standard plastic cards and the data-processing systems with which they are associated by the above-described smart card and supersmart card technology. The cost of modifying or replacing present hardware (ATM's, terminals, etc.) is a very significant obstacle. However, another major obstacle is the fact that fullest use of smart card technology contemplates that a single smart card would be used to facilitate multiple, widely-divergent types of transactions. For example, a single smart card could be used in place of several separate credit or debit cards issued by the same or different financial institutions. In addition, the same smart card could also provide telephone access, ATM access at several different banks, as well as other equally diverse end uses. Each of this multiplicity of different types of transactions is currently handled by a separate standard plastic card, each of which conventionally bears visible indicia in the form of advertising, trademarks and company names. These visible indicia are considered valuable adjuncts of the business of the institution or company (distributor) which provided the card. On the other hand, if this multiplicity of separate cards is replaced with a single card, the goodwill associated with the visible indicia on each card would be lost as there is simply not room on a single smart card to include all these separate indicia and each would dilute the goodwill of the other even if such room existed. Consequently, distributors of such cards have a natural and very strong aversion to simply becoming an account number stored in the memory of a microchip along with many other account numbers in a single smart card. It is believed that the combination of these practical obstacles (price and loss of distributor identity) has and will continue to markedly inhibit the growth of the use of smart card technology.

Further, loss or theft of a single smart card, containing the capability of conducting or facilitating multiple transactions would have the possible effect of facilitating fraud in each of such multiple transactions. Therefore, the loss or theft of a single smart card could have much more serious consequences to both the rightful possessor and the distributor than the loss of an individual standard plastic card which is capable of use in only a single one of such transactions.

Another chief concern of the banking industry, regarding the smart and supersmart cards, is maintenance. Sitting on such a thin card while in a wallet, tends to flex the card and damage its internal components. Use of the card in a hand imprinter also imposes stress damage on the card. The multifunction smart card has been estimated by the industry to cost between $75 and $100. This is based on an assumed life of five years.

It would be highly desirable to provide a data-processing system which is capable of use in conducting transactions in the manner envisioned by current smart and supersmart card technology, but which does not require the replacement of current standard transaction cards issued by individual distributors for conducting a single type of transaction. Moreover, it would be highly advantageous to provide a data-processing system incorporating the use of a single-purpose transaction card, which provides the transactional advantages of current smart card technology, but which does not increase the potential for fraud loss if a component of the system is lost or stolen.

Further, it would be highly desirable to provide a multifunction transaction card unrestricted by dimension limitations. This would greatly reduce the fabrication and maintenance costs and enhance performance.

Accordingly, the principal object of the present invention is to provide improvements of the present data-processing systems, which involve the interaction of a central computer, a remote terminal and a transaction card, for conducting or facilitating transactions.

Another object of the invention is to provide an economical, effective "off-line" transaction authorization/identification system.

Another object of the invention is to provide such an improved system which can be used without increasing the potential for fraud loss.

Still another object of the invention is to provide an improved data-processing system including single-purpose transaction cards, each of which can carry the commercially-valuable indicia of its respective distributor.

Still another and further object of the invention is to provide a data-processing system of the type which involves the co-action of a central computer, a remote terminal and a transaction card which can be adopted at a significantly lower cost or for broader use than systems currently proposed involving the use of smart card technology.

These, other and further objects and advantages of the invention will be apparent to those skilled in the art from the following detailed description thereof, taken in conjunction with the drawings which:

FIG. 1 schematically depicts an improved data-processing system embodying the present invention according to its broadest aspects;

Figure 5:
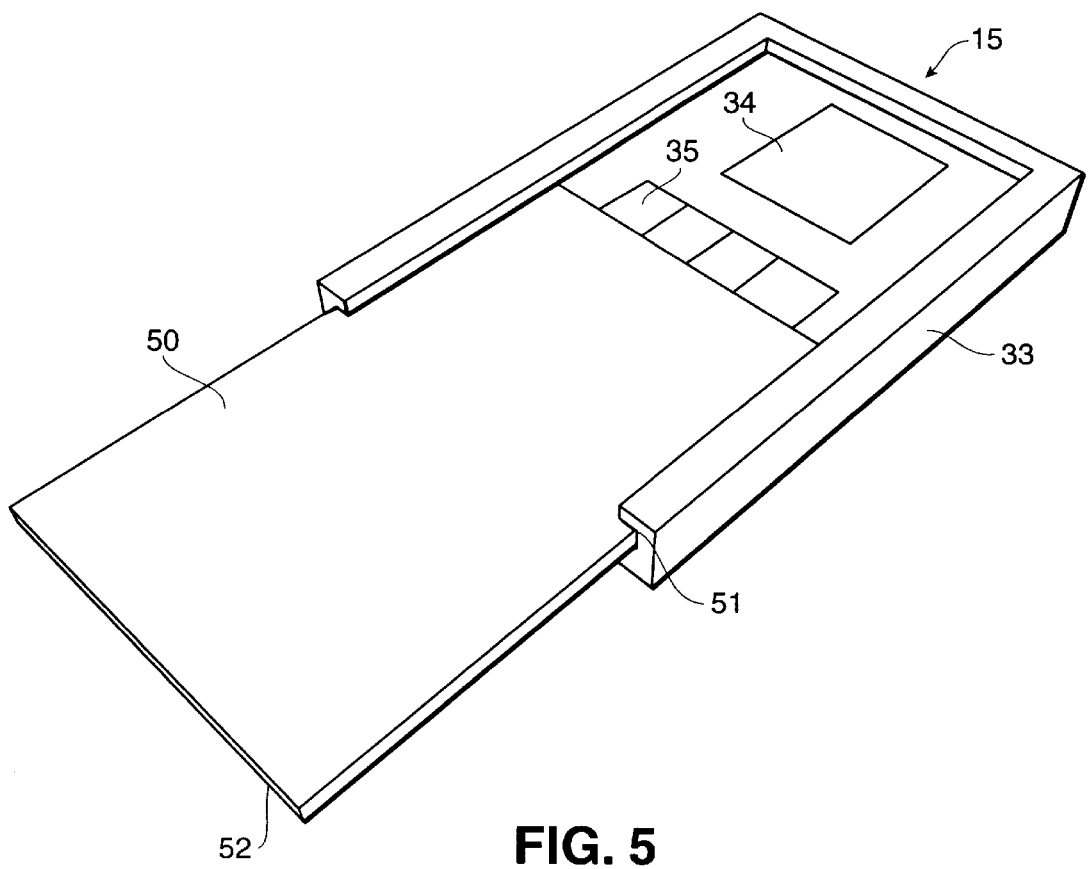

FIG. 5. illustrates a further embodiment of the invention consisting of a combination smart card/transaction authorization device.

Briefly, in accordance with the invention, I provide improvements in the type of data-processing system of the prior art which includes a central computer, a remote terminal for communicating with the central computer and a transaction card. The improvements of my invention comprise, in combination, at least one of such transaction cards, a transaction authorization device and means for communicating an authorization signal to the remote terminal.

The transaction authorization device (TAD) is separate from the transaction card and separate from the remote terminal. The TAD comprises logic means, data-entry means and a program. The logic means includes a memory. The data-entry means provide for entering into the memory an identifier, transaction-specific data and authorization data. The program compares the entered transaction-specific data with the entered authorization data. If this comparison satisfies required criteria of the program, the program causes the TAD to generate a transaction-specific authorization signal.

Finally, means are provided for communicating such transaction-specific authorization signal to the remote terminal.

Figure 1:
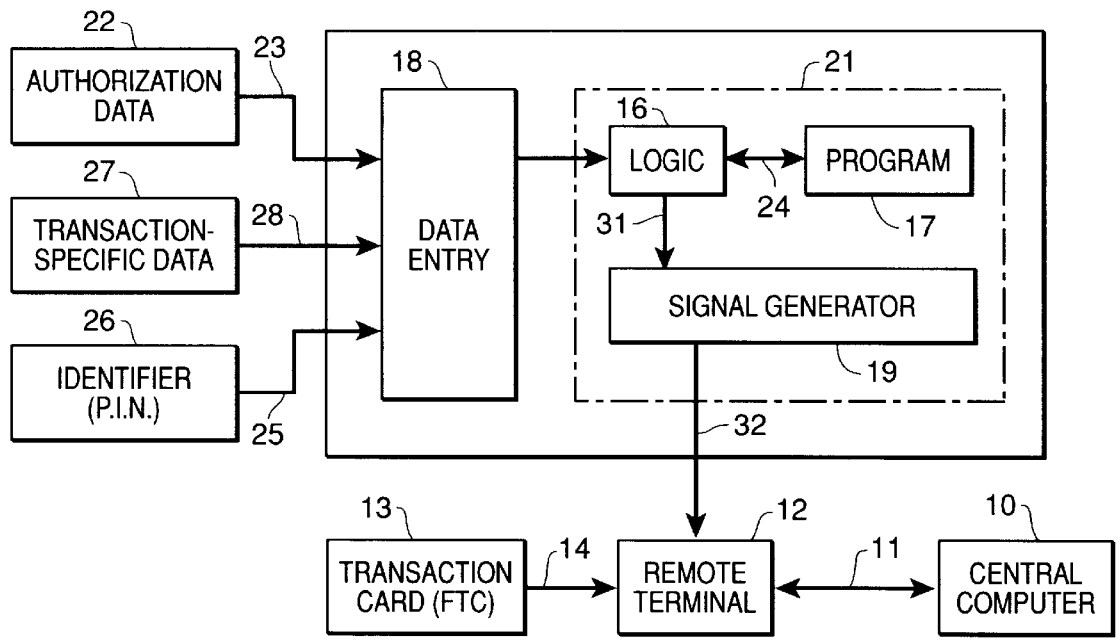

Turning now to the drawings, FIG. 1 is a block diagram of an improvement data-processing system embodying the present invention, considered in its broadest aspects. As shown, a central computer 10 is arranged for permanent or intermittent communication (indicated by the line 11) with a remote terminal 12 which is physically located temporarily or permanently at the intended situs of a transaction to be performed. A transaction card 13, e.g., an FTC, bears visible and/or machine-readable indicia which is communicated, as indicated by line 14, to the remote terminal 12. These indicia provide general information relating to the rightful possessor of the transaction card 13, e.g. account number, identity of the distributor of the card, name of the rightful possessor, expiration date, etc. This information, depending on whether it is visually-readable or machine-readable, is communicated 14 to the remote terminal 12 either manually, through a data-entry device (not shown) associated with the remote terminal 12 or electronically, e.g., by an OCR or magnetic stripe-reading system (not shown) associated with the remote terminal 12.

A transaction authorization device (TAD) includes components formed as a single unit 15, which is physically separate from the transaction card 13 and physically separate from the remote terminal 12. The TAD includes a logic component 16, a program 17, data-entry means 18 and a signal generator 19. The logic 16 includes a memory capability. Although shown as separate components, it will be understood by those skilled in the art that several of these subelements of the TAD 15 may be included in a single element. For example, the logic 16 (and associated memory), the program 17 and the signal generator 19 may all be included in a single microcomputer chip as indicated by the dashed line 12.

In use, the TAD is supplied with authorization data 22 by the distributor of the transaction card 13. This authorization data is supplied as indicated by the line 23 through the data-entry component 18 of the TAD 15 and is stored as indicated by the line 24 in the memory component of the logic 16. For example, such authorization data 22 could include an account number and initial account balance (for a debit card) or upper limit (for a credit card and other operating limitations.

At the time a specific transaction (e.g., retail sale, deposit or withdrawal, etc.) is contemplated, the rightful possessor of the transaction card 13 enters, as indicated by line 25, an identifier 26 (e.g., Personal Identification Number or "PIN") by means of the data-entry component 18 into the logic memory 16. Finally, transaction-specific data 27 (e.g., the amount of purchase or withdrawal) is entered, as indicated by the line 28 through the data-entry component 18 into the logic memory 16.

Upon receipt of the inputs 23, 25 and 28, the logic 16, operating according to rules of the program 17, compares the identifier 26, authorization data 22 and transaction-specific data 27. If such comparison satisfies the requirements of the program 17, the logic 16, as indicated by the line 31, causes the signal generator component 19 to generate a transaction-specific authorization signal 32 which is communicated to the remote terminal 12. As will be appreciated, this communication may take place electronically, for example through contacts on the TAD which temporarily are connected to mating contacts of the remote terminal 12. Alternatively, a signal can be communicated manually by a data-entry device (not shown) associated with the remote terminal 12.

Upon receipt of the authorization signal 32, the remote terminal 12, either in real time or periodically, communicates (as indicated by line 11) information concerning the transaction to the central computer 10. The central computer 10 may then decipher the authorization signal 32 based on its stored information relating to the authorization data 22 which was originally input to the TAD 15, in order to verify the authorization of the transaction.

Figure 2:
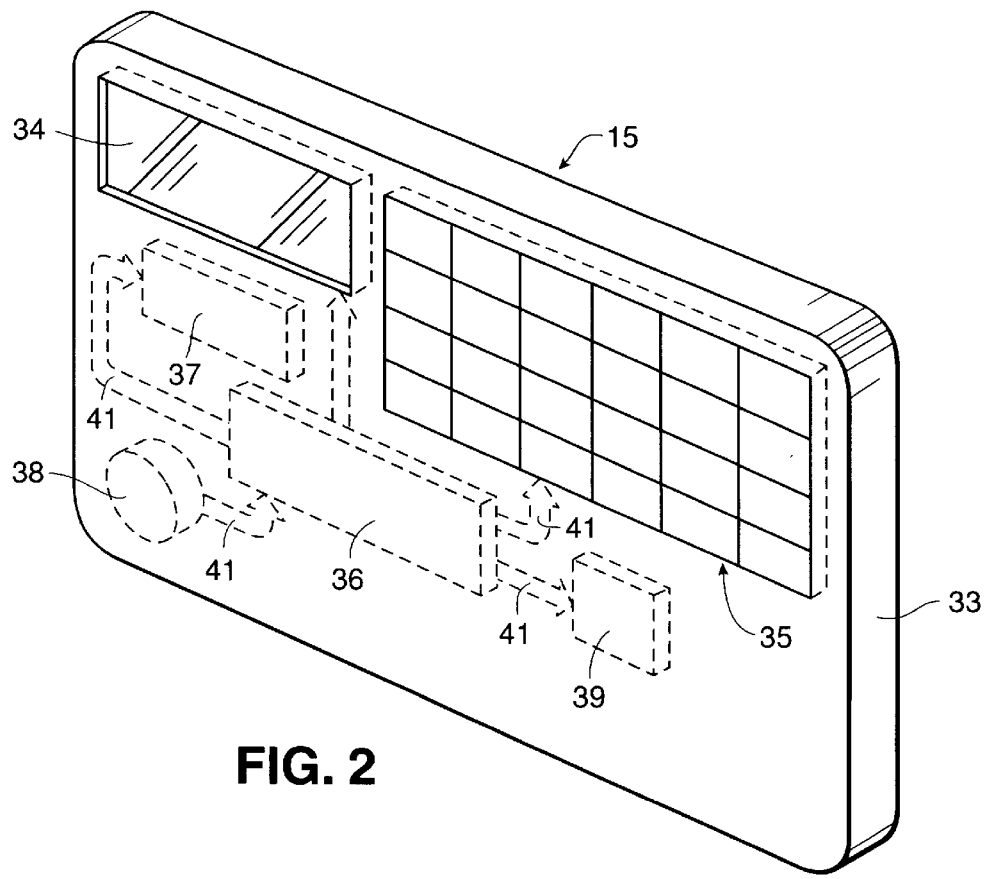
FIG. 2 depicts one possible physical configuration of the transaction authorization device of the system of FIG. 1.

FIG. 2 depicts a physical configuration of the transaction authorization device 15 of the system of FIG. 1. For example, the TAD, generally indicated by reference numeral 15, can be manufactured in the form of a relatively thin card 33 provided with externally-visible liquid crystal display 34 and a multi-key touch pad 35. A microprocessor 36, and E$^2$PROM 37, power supply 38 and induction-coil contacts 39 are embedded in the card 33. The microprocessor 36 can be, for example, an Intel 8048 single chip microcomputer with the program masked thereon and the power supply 38 can be a conventional lithium battery. The functional relationship and electrical interconnection of these components are represented by the arrows 41.

Figure 3:
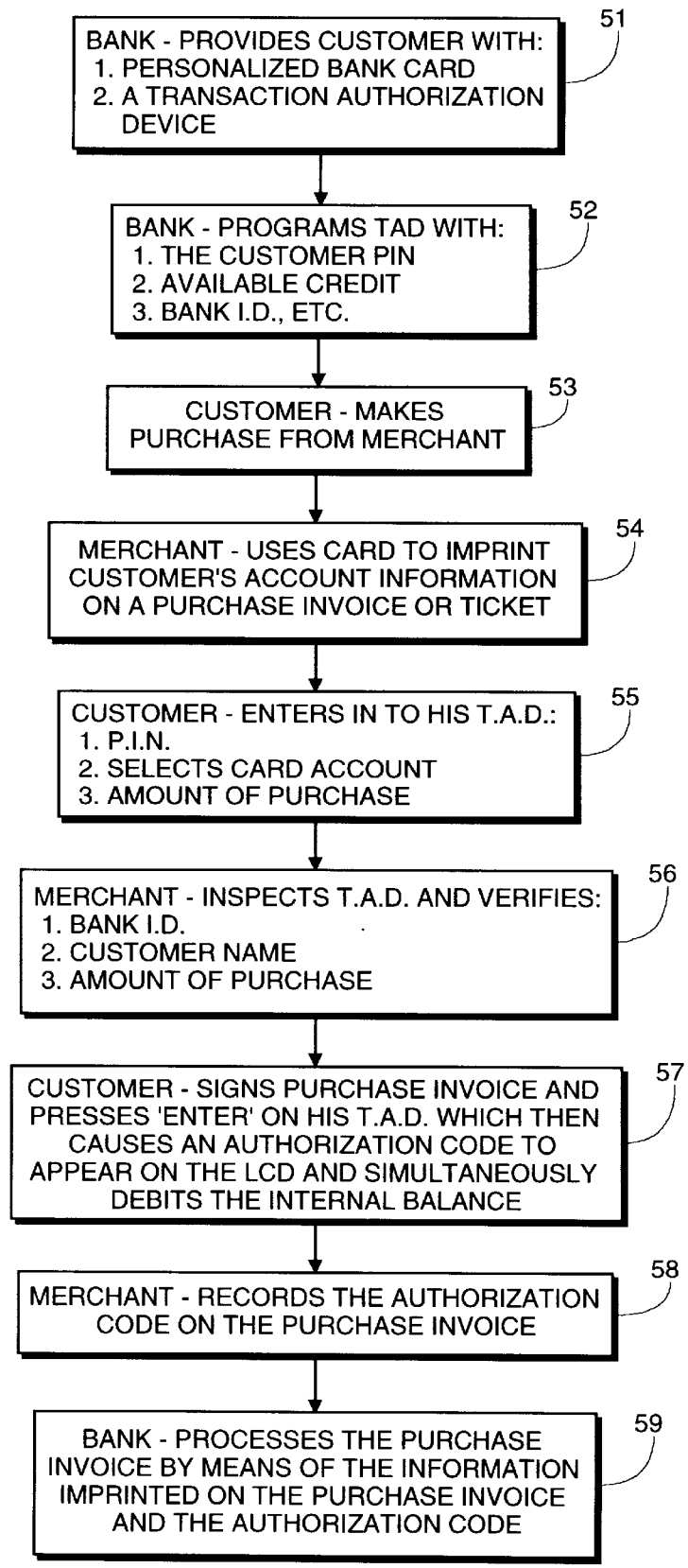
FIG. 3 is a flow sheet depicting the use of the invention of FIG. 1 for telephone access/authorization.

FIG. 3 is a flow sheet depicting the use of the invention in a bank credit card data-processing system. As indicated, in the first step 51, a bank provides a customer with a personalized credit card of the conventional ISO-standard type. The bank also provides the customer with a transaction authorization device (TAD) of the type described in FIGS. 1–2. As indicated 52, the bank programs the TAD with a customer-selected Personal Identification Number (PIN), the available credit and other information such as the bank I.D. number, etc.

In the next step 53, the customer decides on and makes a purchase from a merchant. The merchant, as indicated in the block 54, uses the customer's personalized credit card to imprint the customer's account information on a purchase invoice or sales ticket. In the next step 55 the customer enters into his TAD his PIN, the credit card account which will be used for the transaction and the amount of the purchase. The merchant then physically inspects the TAD and verifies the bank I.D. number, the customer name and the amount of the purchase, all as indicated in set 56. In the next step 57 the customer signs the purchase invoice and presses an "enter" key on his TAD which then causes an authorization code to appear on the DCD and simultaneously debits the internal credit balance.

In the next step 58 the merchant records the authorization code on the purchase invoice and, as indicated in step 59, the bank then processes the purchase invoice by means of the information imprinted thereon and the authorization code.

Figure 4:
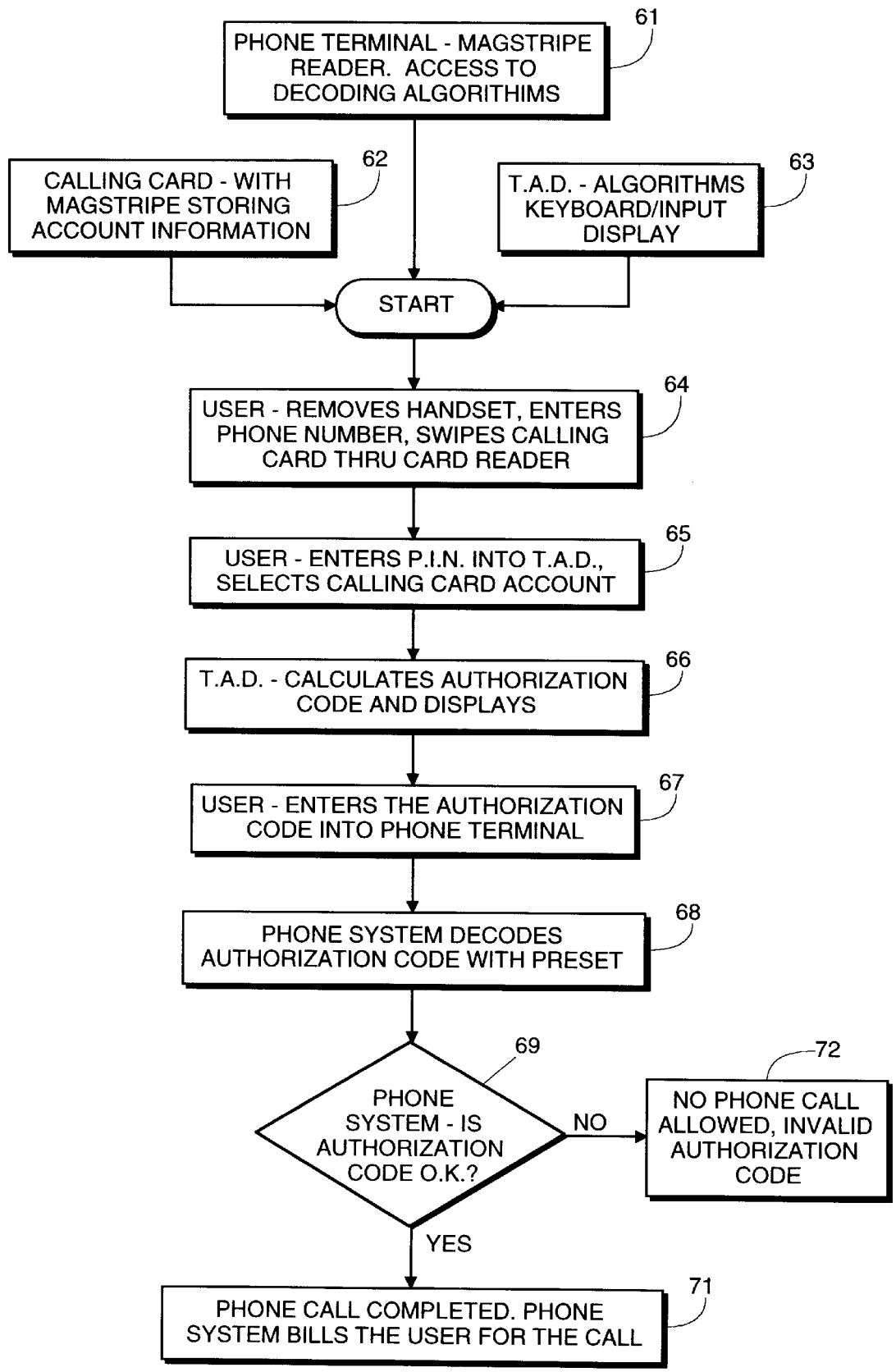
FIG. 4 depicts a telephone access autherization procedure utilizing the system of FIG. 1.

FIG. 4 depicts a telephone access authorization procedure utilizing the data-process system of the invention. The system consists of a phone terminal 61 which includes a magnetic-stripe reader and which has access to the phone system's decoded algorithms. The customer is provided with a standard telephone calling card 62 which includes a magnetic stripe for storing account information. The customer also is provided with a TAD 63 which contains the decoding algorithms, a keyboard input and an LCD. To place a call, as indicated in the block 64, the user removes the handset of the phone terminal, dials the phone number in the usual fashion and passes the calling card through the mag-stripe reader. Then, as indicated in the block 65, the user enters his PIN and calling card account selection in the keyboard of the TAD 63. In the next step 66 the TAD, using its internal algorithms, calculates and displays an authorization code into the phone terminal 61, as indicated in block 67. In the next step 68 the decoding algorithms in the phone system then decode the authorization code and, as indicated in block 69 determines whether the authorization code is correct. If the answer is yes, as indicated in block 71, the phone call is completed and the phone system bills the user for the call. On the other hand, if the answer is no, as indicated by block 72, the phone call is prohibited.

As will be apparent to those skilled in the art, the transaction authorization device depicted in FIGS. 3 and 4 can be the same device. In fact, a single TAD can be used to authorize multiple kinds of transactions between the rightful possessor of the TAD and numerous different issuers of transaction cards. Illustratively, the same TAD can be programmed with PIN's and other transaction-specific data and authorization data relating to several credit card accounts, several debit accounts, several phone accounts and similar data relating to a wide variety of other transactions such as building entry, pay television, etc. Thus, as distinct from current smart card technology, a single TAD can be used to authorize transactions which are initiated from a whole plurality of separate standard transaction cards. Furthermore, the TAD can be specially shaped and configured to prevent or discourage the rightful possessor from carrying it in his wallet, along with standard transaction cards. This greatly decreases the likelihood that the TAD will be lost or stolen at the same time such transaction cards are lost or stolen, thereby materially improving the overall security of the data-process system.

As depicted in FIG. 5, the TAD, as a separate card, but used in combination with a conventional bank card, is a completely self-contained transaction and authorization center. No additional equipment is required, and no change in the existing credit card infrastructure in procedure or equipment is necessary.

This concept of separating the bank card function from the authorization function into separate cards, provides an off-line authorization system without disturbing the present credit card infrastructure.

The "supersmart" card 15 (combination of TAD 33 and conventional card 50) have a plastic slot 51 along two sides and one end to allow the conventional bank card to be slid in and cover the face of the TAD 33. This will cover the keyboard 35, display panel 34 and electronic contacts of the TAD. The magnetic stripe and customer signature on the underside 52 of the bank card 50 is also protected. The TAD 33 (dimensionally unrestricted) is a sturdy 2 to 4 times thicker than the bankcard alone, whereas the single multifunction card, now under development by the credit card industry, must of necessity be no thicker than the conventional bank card, i.e. approximately 1/32".

The supersmart card itself will not be used in the imprinter. The removable conventional bank card 50 is intended for use with current imprinters and ATM terminals. The "supersmart" card does not require ultra thin integrated circuit devices which are expensive, the considerable combined thickness of the TAD 33 and superimposed bank card 50 provides for greater protection of the total system and is less subject to flexing and bending as with the present thin smart card system.

By the in-use combination of two cards, the conventional bank card and a separate dimensionally unrestricted TAD, purchases can be processed in the normal manner using the customer's conventional bank card, and obtaining an off-line authorization by means of the customer's supersmart card.

This simple procedure is as follows:

For invoice or sales slip processing the customer slides the bank card out of the supersmart card and the merchant runs the bank card through the imprinter or POS terminal as usual. For transaction authorization the customer inputs his PIN number into his supersmart card, the customer selects the correct account, the customer inputs the amount of the purchase, the TAD generates an authorization number, the merchant writes the authorization number on the imprint voucher or types it into a POS terminal, and the bank card is slid back into the TAD card.

Having described my invention in such terms as to enable those skilled in the art to understand and practice it and, having identified the presently preferred embodiments thereof,

I claim:

1. A supersmart card system for operation with a data processing system, the data processing system including a central computer and means for transmitting transaction specific data between the central computer and the supersmart card system, the supersmart card system comprising:

a plurality of transaction cards corresponding to a plurality of different financial institutions or service providers; and a portable, user-carried transaction authorization device separate from said plurality of transaction cards, said transaction authorization device including:
(1) logic means having a memory for storing identifier data relating to the identity of a user and authorization data relating to the authorization of transactions between a user and financial institutions or service providers;
(2) data entry means for enabling a user to enter into said logic means:
(a) identifier data relating to the identity of a user;

(b) authorization data relating to the authorization of transactions between a user and financial institutions or service providers; and (c) transaction specific data, (3) transaction card selection means for enabling a user to select a particular transaction card for processing a particular transaction; and (4) a program for comparing said transaction specific data with said authorization data, for generating a transaction specific authorization signal if said comparison satisfies authorization requirements of said program, for furnishing the authorization signal to merchant, and for modifying the authorization data with every use of said supersmart card.

2. The supersmart card system of claim 1 wherein said plurality of transaction cards are selected from the group consisting of credit cards, debit cards, and phone cards.

3. The supersmart card system of claim 1 wherein said transaction authorization device has a thickness of greater than $1/32$ inch so as to be incapable of being read by conventional ISO standard remote magstripe readers.

4. The supersmart card system of claim 1 wherein said transaction authorization device further includes a display means for displaying said authorization signal.

5. A method of effecting off-line authorization for transaction card transactions between a customer and a merchant, comprising:

(a) providing each of a plurality of customers with a plurality of transaction cards corresponding to a plurality of financial institutions or service providers;

(b) providing each of the plurality of customers with a transaction authorization device to be carried by the customer, said device including, (1) logic means, including memory;

(2) data entry means for entering data into said memory, including
 (a) identifier data,
 (b) authorization data, and
 (c) transaction-specific data;

(3) transaction card selection means for enabling a user to select a particular transaction card for processing a particular transaction; and (4) a program for
 (a) comparing said transaction-specific data with said authorization signal if said comparison satisfies authorization requirements of said program;
 (b) generating a transaction specific authorization signal if said comparison satisfies authorization requirements of said program, and;
 (c) updating the authorization data with use of the transaction card;

(c) selecting a transaction card of said plurality of transaction cards for processing a particular transaction;

(d) reading the selected transaction card to provide the merchant with transaction card issuer identification and customer account number;

(e) inputting the identification of the selected transaction card into the transaction card selection means of the transaction authorization device;

(l) inputting the customer PIN and transaction specific data to the transaction authorization device; and (g) furnishing the authorization signal to the merchant.

* * * * *